(12) United States Patent
Gaudry et al.

(10) Patent No.: US 8,544,598 B2
(45) Date of Patent: Oct. 1, 2013

(54) SOUNDPROOFING PANEL FOR TURBOMACHINE AND TURBOMACHINE COMPRISING SUCH A PANEL

(75) Inventors: Florian Gaudry, Paris (FR); Romain Plante, Avon (FR); Noel Robin, Villejust (FR); Georges Jean Xavier Riou, Melun (FR); Jacky Novi Mardjono, Nogent sur Marne (FR); Francois Marie Paul Marlin, Villiers Sous Grez (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/588,669

(22) Filed: Aug. 17, 2012

(65) Prior Publication Data

US 2013/0048414 A1  Feb. 28, 2013

(30) Foreign Application Priority Data

Aug. 22, 2011  (FR) .................................... 11 57422
Oct. 10, 2011  (FR) .................................... 11 59105

(51) Int. Cl.
  *B64D 33/02*  (2006.01)
(52) U.S. Cl.
  USPC ........................ 181/214; 181/213; 415/119
(58) Field of Classification Search
  USPC ................................ 181/213, 214; 415/119
  See application file for complete search history.

(56) References Cited

U.S. PATENT DOCUMENTS

| | | | |
|---|---|---|---|
| 4,293,053 A | 10/1981 | Shuttleworth et al. | |
| 4,452,563 A * | 6/1984 | Belanger et al. | 415/9 |
| 4,453,887 A * | 6/1984 | Schucker | 415/119 |
| 5,581,054 A | 12/1996 | Anderson et al. | |
| 6,123,170 A * | 9/2000 | Porte et al. | 181/214 |
| 2004/0094359 A1* | 5/2004 | Porte et al. | 181/214 |
| 2008/0078612 A1* | 4/2008 | Strunk | 181/214 |
| 2008/0185215 A2* | 8/2008 | Strunk | 181/214 |
| 2008/0206044 A1* | 8/2008 | Porte et al. | 415/119 |
| 2010/0096213 A1* | 4/2010 | Frustie et al. | 181/214 |
| 2010/0232932 A1 | 9/2010 | Vauchel et al. | |
| 2011/0271686 A1* | 11/2011 | Francisco et al. | 60/783 |
| 2012/0241249 A1* | 9/2012 | Porte et al. | 181/214 |

FOREIGN PATENT DOCUMENTS

| | | |
|---|---|---|
| EP | 0 898 063 A1 | 2/1999 |
| FR | 2 898 870 A1 | 9/2007 |
| GB | 2 065 766 A | 7/1981 |
| GB | 2 273 131 A | 6/1994 |

OTHER PUBLICATIONS

French Preliminary Search Report and Written Opinion issued Mar. 27, 2012 in corresponding French Application No. 11 59105 filed on Oct. 10, 2011 (with an English Translation of Categories).

* cited by examiner

*Primary Examiner* — Forrest M Phillips
(74) *Attorney, Agent, or Firm* — Oblon, Spivak, McClelland, Maier & Neustadt, L.L.P.

(57) ABSTRACT

A one-piece soundproofing panel which is attached within an circumferential air blower casing of a turbomachine, with an axis, in which circulates an airflow from upstream to downstream, is disclosed. The panel includes a circumferential rigid seat with a longitudinal cylindrical part, arranged to axially extend with respect to the axis A of the turbomachine, having an outside surface, intended to come to extend facing with an internal surface of the air blower casing, and an internal surface to which is applied a soundproofing coating; and an annular fastening flange, formed at the upstream end of the longitudinal cylindrical part, radially outwardly extending, the fastening flange being arranged to cooperate with a fastening flange of the air blower casing.

18 Claims, 6 Drawing Sheets

SOUNDPROOFING PANEL FOR TURBOMACHINE AND TURBOMACHINE COMPRISING SUCH A PANEL

BACKGROUND OF THE INVENTION

1. Field of the Invention

The present invention relates to the field of soundproofing of an aircraft turbomachine and, more particularly, soundproofing upstream to an air blower for a turbomachine.

2. Description of the Related Art

Figure 1:
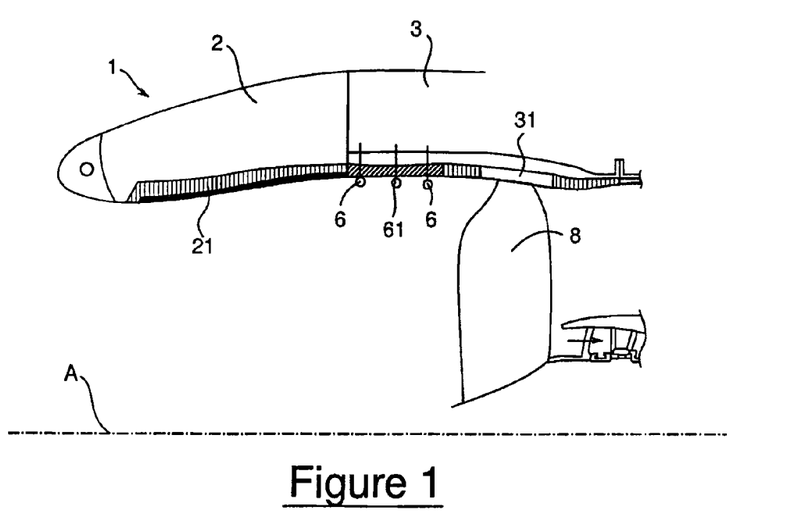
FIG. 1 is a partial schematic half-view, in axial section, of the inlet duct and the air blower of a turbomachine according to the prior art (already presented)

A turbomachine such as an engine turbojet or an aircraft turboprop typically comprises an annular casing for the air blower, axially extending along the turbomachine axis, in which an air blower is mounted, i.e., a rotor disc comprising large size blades. In operation, an airflow circulates from upstream to downstream within the turbomachine. For an aircraft propulsion, the turbomachine is mounted inside an engine nacelle integral with an aircraft wing. Typically, the engine nacelle comprises an annular inlet duct which is mounted upstream the air blowing casing. Referring to FIG. 1 representing a cross sectional half-view of a turbomachine 1 having axis A, soundproofing panels 21, 61 are traditionally mounted inwardly to the inlet duct 2 and to the air blower casing 3 to limit noise annoyance upstream to the turbomachine 1. In the simplest case, the soundproofing panels 21, 61 consist of a honeycomb construction known from person skill in the art. To extend the sound attenuation to a large frequency range, an acoustic panel can comprise several porous layers inserted between honeycomb layers. These acoustic panels are suited to weaken soundwaves coming from the turbomachine 1 and, in particular, soundwaves coming from the air blower 8 of the turbomachine 1. The soundproofing panels 21, 61 are located upstream to an abradable layer 31 of the air blower casing 8, located just in front of the blades of the air blower 8.

As shown in FIG. 1, the inlet duct 2 and the air blower casing 3 comprise each their own soundproofing panels 21, 61 so as to form an internal continuous soundproofing skin. In particular, the air blower casing 3 traditionally comprises, at its circumference, several soundproofing panels 61 end-to-end mounted and integral with the air blower casing 3 by means of fastening screws 6 radially extending with respect to the axis A of the turbomachine as shown in FIG. 1. Such a fastening mode presents drawbacks because it requires to use many fastening screws 6 which, on one hand, compromise the mass of the turbomachine 1 and may damage the blades of the air blower 8 in case of loss or break. On the other hand, the more or less wide interface regions between the panels infer an alternation of smooth and treated regions near the air blower 8 (forming discontinuities of acoustic impedance), which give rise to increases of the noise levels of the turbojet engine for some engine speeds. Additionally, the implementation of the numerous fastening screws on the panels requires to provide for densified regions inside them which impair the acoustic efficiency.

To limit the number of fastening screws 6, the patent application FR 2 935 017 to SNECMA Corporation suggested to lengthen the air blower casing 3 and to attach a single soundproofing panel to the air blower casing 3 and to the inlet duct 2. In practice, the maintenance of such an acoustic panel is difficult to operate since it is necessary to immobilize the turbomachine to proceed to the withdrawal of the damaged panel by a new panel. Besides, if only the downstream part of the panel is damaged, the whole panel must be replaced, increasing the maintenance costs.

BRIEF SUMMARY OF THE INVENTION

To eliminate at least some of these drawbacks, the invention relates to a one-piece soundproofing panel intended to be fixed inwardly to a circumferential air blower casing of a turbomachine, comprising an axis, in which circulates an airflow from upstream to downstream, the panel including a circumferential rigid seat including: a longitudinal cylindrical part, arranged to axially extend with respect to the turbomachine axis, comprising an outside surface, intended to extend facing with an internal surface of the air blower casing, and an internal surface to which is applied a soundproofing coating; and a annular fastening flange, formed at the upstream end of the longitudinal cylindrical part, radially extending outwardly, the fastening flange being arranged to cooperate with a fastening flange of the air blower casing.

The soundproofing panel according to the invention is a one-piece panel which limits the number of assembling operations as well as the number of fastening means (screws, etc.). Besides, thanks to the radial fastening flange, the panel can be mounted with longitudinal fastening means without the need of radial fastening means susceptible to damage the operating air blower.

According to an aspect of the invention, the downstream end of the insulation panel comprises support means adapted to maintain the outside surface of the insulation panel near the internal surface of the air blower casing. Advantageously, the soundproofing panel is maintained upstream and downstream which allows to reduce the radial thickness of the fastening flange so as to limit its mass and its cost. Besides, it allows to radially set the downstream end of the insulation panel so as to allow an optimal soundproofing.

Finally, it allows to increase the rigidity of the assembly and to attenuate the vibrations resulting from interaction with the internal surface of the casing. Indeed, the insulation panel is near the internal surface of the air blower casing, i.e. at a small distance, nevertheless without being in contact.

Preferably, the support means are formed in the soundproofing coating of the insulation panel, rather in a reinforcement region of said coating. The support means so allow not to modify the rigid seat of the soundproofing panel which can be then placed near the internal surface of the air blower casing, preferably, at a distance of a few millimetres to facilitate the assembly and to take into account manufacturing tolerances.

Still preferably, the support means are in the shape of an annular tongue suited to be inserted into a groove formed in a portion of the turbomachine, preferably, in an element of air blower casing. Such an annular tongue is simple to obtain by machining. Besides, the radial thickness of the tongue can be adjusted depending on the radial thickness of the groove of the turbomachine to obtain an optimal support.

According to an aspect of the invention, the support means are in the shape of a first conical seating surface adapted to cooperate with an element of air blower casing by wedging effect. A conical surface, preferably flared from upstream towards downstream, allows to adjust the radial position of the downstream end of the insulation panel by modifying the axial position of the insulation panel, the skew slope of the insulation panel allowing to make the insulation panel slide in the turbomachine until its final position of use.

Preferably, the rigid seat consists of a composite material so as to limit the wears at the interface with an air blower casing, preferably, in composite material. Besides, such a rigid seat has a small mass which is advantageous for its integration in a turbomachine.

Still preferably, the annular fastening flange comprises axial openings for fastening to the air blower casing and to an inlet duct so as to allow the detachably assembly of the panel to the interface between the air blower casing and the inlet duct.

According to an aspect of the invention, the annular fastening flange is scalloped so as to reduce the panel mass. Preferably, the shape of the scalloping of the fastening flange depends on the shape of the flange of the air blower casing and on the shape of the flange of the inlet duct so as to limit the overhang of the soundproofing panel.

According to an aspect of the invention, the soundproofing coating is stuck on the internal surface of the rigid seat. Sticking the coating allows to avoid the use of fastening means capable to damage the air blower blades and to maximize the effective surface of the acoustic coating.

According to an aspect of the invention, the upstream and/or downstream ends of the soundproofing coating comprise a rigid reinforcement to create a border at the interface to improve the junction at the interface with coatings of the air blower casing and/or the inlet duct.

Preferably, the soundproofing coating consists of a one-piece sandwich panel comprising at least a honeycomb layer covered with a perforated skin. Such a coating is advantageous to attenuate acoustic waves coming from upstream to a turbomachine.

According to another aspect of the invention, the rigid seat of the soundproofing panel is formed by a plurality of glass folds the upstream end of which is bent to form the upstream fastening flange.

Preferably, the soundproofing panel comprises an internal part comprising a plurality of glass folds the upstream end of which is bent to form the upstream fastening flange with the plurality of glass folds of the rigid seat.

Still preferably, the soundproofing coating is provided between the plurality of glass folds of the rigid seat and the plurality of glass folds of the internal part. So, the soundproofing panel forms an integrated panel which is fast and simple to manufacture.

The invention also relates to a turbomachine, intended for the propulsion of an aircraft, comprising a turbomachine axis in which circulates an airflow from upstream to downstream, the turbomachine comprising a circumferential air blower casing, a circumferential inlet duct mounted upstream to the air blower casing and a soundproofing panel such as previously defined, the fastening flange of the acoustic panel extending between the inlet duct and the air blower casing. The panel is detachably mounted which allows not to immobilize the turbomachine for an important duration during the maintenance operations.

Preferably, the air blower casing comprising an upstream fastening flange, the inlet duct comprising a downstream fastening flange, the fastening flange of the panel extends between the fastening flanges of the inlet duct and the air blower casing. The assembly of the inlet duct is typical and does not require to modify the air blower casing or the inlet duct to mount the soundproofing panel to the interface between the air blower casing and the inlet duct.

Still preferably, the fastening flanges of the inlet duct, the air blower casing and the insulation panel are made integral with themselves by fastening means longitudinally extending with respect to the turbomachine axis. The soundproofing panel and the inlet duct are attached at the same time, which yields a saving of time.

Preferably, the turbomachine comprises support means of the downstream end of the soundproofing panel in an element of air blower casing. The support means can only be integral with the element of casing or distributed between the element of casing and the insulation panel. Advantageously, the soundproofing panel is maintained upstream and downstream which allows to reduce the radial thickness of the fastening flange to limit its mass and its cost.

Preferably, the element of air blower casing is an annular layer attached to the internal cylindrical surface of the air blower casing downstream to the insulation panel. The annular layer can be advantageously replaced during an operation of maintenance when the support means are worn out. Still preferably, the annular layer is a layer of abradable and/or soundproofing.

According to an aspect of the invention, the support means are in the shape of an annular tongue and a groove adapted to cooperate with the annular tongue to allow holding of the panel by complementary forms.

Preferably, the support means are in the shape of an annular tongue integral with the downstream end of the insulation panel and of a groove, formed between the internal surface of the air blower casing and at least a tongue integral with the element of air blower casing, adapted to cooperate with the annular tongue of the insulation panel. Advantageously, the groove allows to index the position of the insulation panel.

According to a first aspect, the tongue integral with the element of air blower casing is annular.

According to a second aspect, a plurality of tongues is distributed on the element of air blower casing at the circumference of the air blower casing. A plurality of tongue has a reduced mass in comparison with a circumferential tongue.

Preferably, the tongue integral with the element of air blower casing is assembled to the upstream end of the element of air blower casing. So, the support means of the casing element can be adapted depending on the support means of the insulation panel. The flexibility of use is increased.

According to an aspect of the invention, the support means are in the shape of a first conical seating surface integral with the downstream end of the insulation panel and of a second conical seating surface integral with the element of air blower casing adapted to cooperate with the first conical seating surface by wedging effect. Conical surfaces, preferably flared from upstream towards downstream, allow to adjust the radial position of the downstream end of the insulation panel by modifying the axial position of the insulation panel, the skew slopes allowing to make the insulation panel slide in the turbomachine until its final position of use.

Preferably, the second conical seating surface is directly machined in the element of air blower casing.

Alternately, the turbomachine comprises an interface element assembled to the upstream end of the element of air blower casing, the second conical seating surface being formed on said interface element. So, the support means of the casing element can be adapted depending on the support means of the insulation panel. The flexibility of use is increased.

Preferably, the interface element is a silicone joint, preferably hollow so as to improve the binding to the interface.

The invention also relates to an assembly method for a turbomachine such as previously defined, in which method:
 the soundproofing panel is mounted in the air blower casing so that the outside surface of its rigid seat is facing with the internal surface of the air blower casing, the fastening flange of the soundproofing panel being in contact with the upstream fastening flange of the air blower casing;

the downstream fastening flange of the inlet duct is placed in contact with the fastening flange of the soundproofing panel; and the fastening flanges of the inlet duct, the soundproofing panel and the air blower casing are integral with each other.

Preferably, the soundproofing panel is supported at its downstream end before the fastening flange of the inlet duct is put in contact with the fastening flange of the soundproofing panel so as to increase the accuracy during the assembly.

BRIEF DESCRIPTION OF THE SEVERAL VIEWS OF THE DRAWINGS

The invention will be better understood with the reading of the description which follows, given only as way of example, and with reference to the annexed drawings in which.

It is necessary to note that figures explain the invention in great detail to implement the invention, said figures can naturally serve for better defining the invention if needed.

DETAILED DESCRIPTION OF THE INVENTION

A soundproofing panel 4, intended to be attached inwardly to a circumferential air blower casing 3 of a turbomachine 1 for propulsion of an aircraft, is schematically represented in cross-section in the figures. Typically, referring to FIG. 5, the axial turbomachine 1 comprises a circumferential air blower casing 3 in which is mounted an air blower 8 allowing circulation of an airflow F from upstream to downstream in the body of the turbomachine 1. The turbomachine 1 comprises, upstream to its air blower casing 3, an inlet duct 2, with an annular shape, integral with the engine nacelle of the aircraft connecting the turbomachine 1 to a wing of an aircraft.

Figure 5:
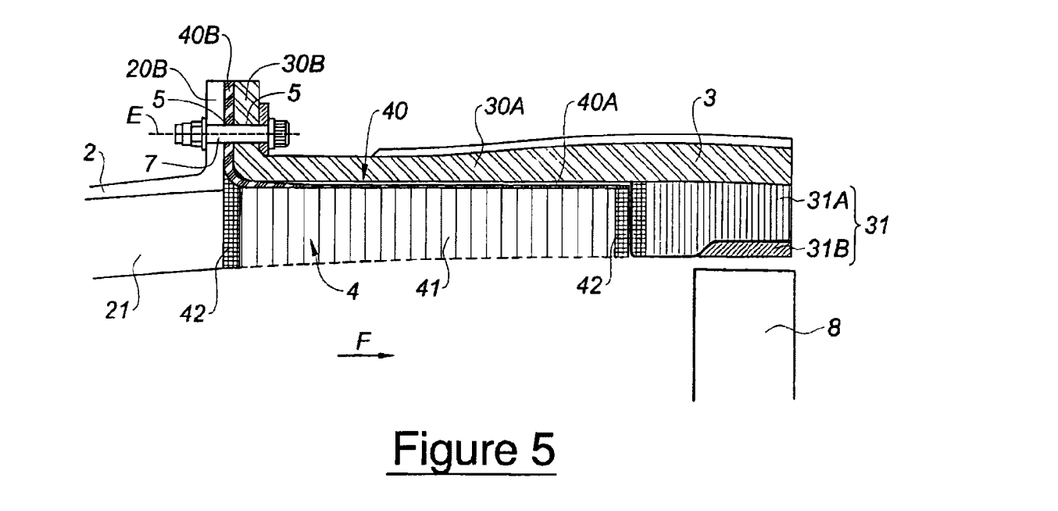
FIG. 5 is a partial schematic half-view, in axial section, of the inlet duct and the air blower casing of a turbomachine to which the soundproofing panel of the FIG. 2 is mounted.

The circumferential air blower casing 3 is essentially cylindrical and surrounds the air blower 8. The circumferential air blower casing 3 comprises annular fastening flanges at its longitudinal ends. The air blower casing 3 ensures the transmission of the efforts from the upstream inlet duct 2 to the intermediate casing (not shown) of the turbomachine 1. The downstream flange (not shown) of the air blower casing 3 is attached by screw-nut type means on an upstream annular flange of the intermediate casing surrounding the compressor of the turbomachine 1 while the upstream flange 30B of the air blower casing 3 is attached by screw-nut type means on an annular downstream flange 20B of the circumferential inlet duct 2 of the turbomachine 1. The inlet duct 2 is typically attached to the upstream end of the air blower casing 3, the fastening flanges 20B, 30B being bolted together.

A downstream annular layer 31 is attached to the internal cylindrical surface of the air blower casing 3 just in front of the blades of the air blower 8. This downstream annular layer 31 comprises a radially outwardly part of support 31A, integral with the air blower casing 3 and a radially inwardly part 31B from abradable material intended to come in contact with the blades of the air blower 8 during the running-in of the turbomachine 1. The axial dimension of this upstream annular layer 31 is essentially equal to the maximal axial dimension of the blades of the air blower 8. Preferably, the radially outwardly support part 31A of the downstream annular layer 31 is an acoustic coating.

An upstream annular layer 21 is attached to the internal cylindrical surface of the inlet duct 2. This upstream annular layer 21 consists of a soundproofing coating and extends only within the inlet duct 2. In this example, the upstream annular layer 21 is stuck on the radially inwardly surface of the inlet duct 2. In other words, the upstream annular layer 21 does not extend within the air blower casing 3.

The annular space determined between the upstream and downstream annular layers 21 and 31 is occupied by an insulation panel 4 according to the invention. First, the general characteristics of the insulation panel according to the invention are going to be presented. The appropriate characteristics for each embodiment of an insulation panel will then be explained with detail. Only the noticeable, structural and functional differences, between the various embodiments, will be described.

Soundproofing Panel 4

A panel 4 includes a circumferential rigid seat 40 including a longitudinal cylindrical part 40A, arranged to axially extend with respect to the axis of the turbomachine 1, and an annular fastening flange 40B, formed at an upstream end of the longitudinal cylindrical part 40A, radially extending towards the outside, the fastening flange 40B of the rigid seat 40 being arranged to cooperate with the upstream fastening flange 30B of the air blower casing 3 and the downstream fastening flange 20B of the inlet duct 2.

Figure 2:
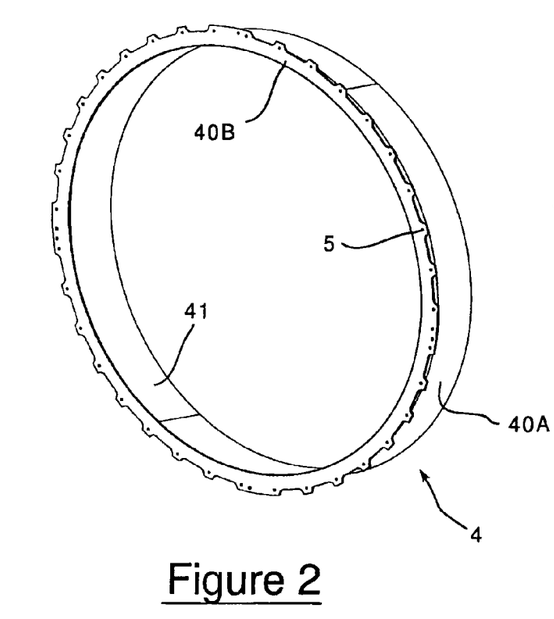
FIG. 2 is a schematic perspective view of a first embodiment of a soundproofing panel according to the invention.
Figure 3:
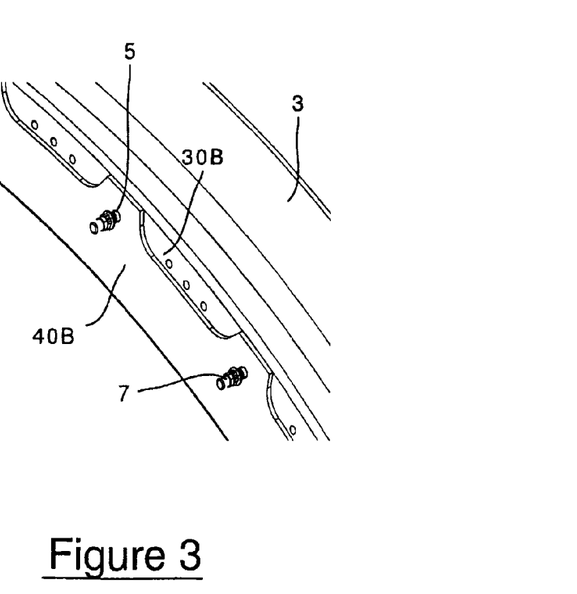
FIG. 3 is a schematic view of the soundproofing panel of FIG. 2 mounted to an air blower casing.

As shown in FIG. 5, the radial dimensions of the fastening flanges 20B, 30B, 40B are essentially equal so as to limit the bulk and the mass of the turbomachine 1. Each fastening flange 20B, 30B, 40B comprises fastening openings 5 longitudinally extending according to the axis E to allow the passage of fastening screws 7 coming to the point of locking together the inlet duct 2, the soundproofing panel 4 and the air blower casing 3. As shown in FIGS. 2 and 3, the annular fastening flange 40B is scalloped so as to limit the mass of the panel 4. In other words, the annular fastening flange 40B comprises a plurality of radial teeth alternated with slots, the fastening openings 5 being formed in the teeth of the annular fastening flange 40B to allow the binding of the panel 4 to the air blower casing 3 and the inlet duct 2 as shown in FIGS. 3 and 5.

The longitudinal cylindrical part 40A of the rigid seat 40 has a length adapted to fill the longitudinal space between the upstream and downstream annular layers 21 and 31. The longitudinal cylindrical part 40A comprises an outside surface, intended to extend facing with the internal surface of the air blower casing 3, and the internal surface to which is applied a soundproofing coating 41. As shown in FIG. 5, the radial thickness in the upstream end of the soundproofing coating 41 is adapted so that the internal surfaces of the upstream annular layer 21 and of the soundproofing coating 41 of the panel 4 are continuous at their interface so as to limit the regions capable to generate aerodynamic losses. Similarly, the radial thickness in the downstream end of the soundproofing coating 41 is adapted so that the internal surfaces of the downstream annular layer 31 and of the soundproofing coating 41 of the panel 4 are continuous at their interface.

Figure 4:
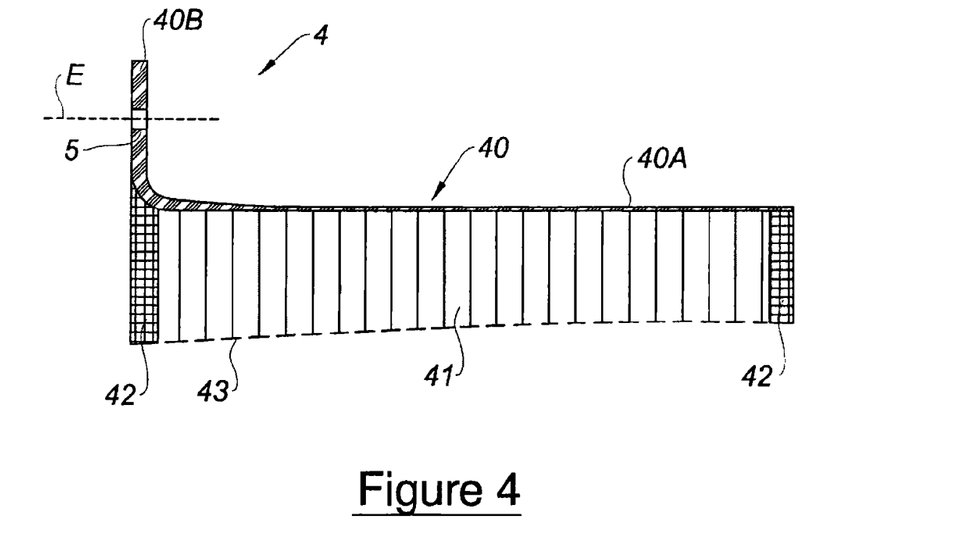
FIG. 4 is a schematic half-view of the soundproofing panel of the FIG. 2.

Preferably, in reference to FIG. 4, the upstream and downstream ends of the soundproofing coating 41 of the panel 4 comprise rigid reinforcements 42 forming dense regions, radially extending, intended to form a border of the acoustic coating to promote the junctions at the interface with the upstream 21 and downstream 31 annular layers.

In this example, the soundproofing coatings of the panel 4 or annular layers 21, 31 consist of a sandwich panel comprising at least a honeycomb layer, for example NOMEX type, covered with a perforated skin 43. Such a coating is adapted to attenuate high amplitude soundwaves, up to approximately 160 dB at the maximal speed of use of the turbomachine.

Figure 6:
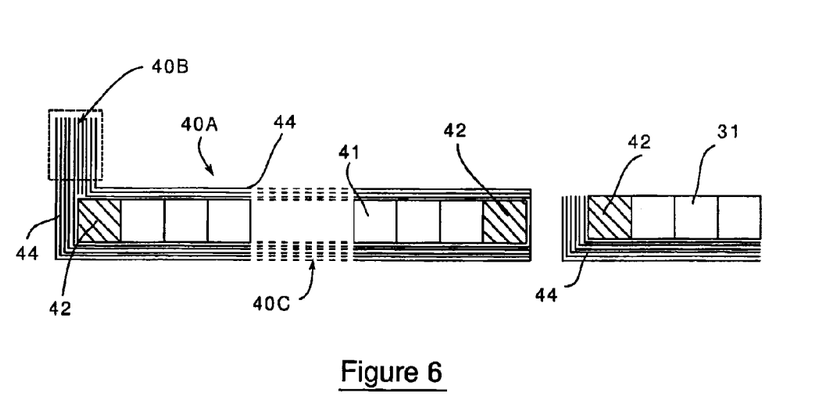
FIG. 6 is a schematic sectional view of a soundproofing panel according to the invention.

Alternately, in reference to FIG. 6, the soundproofing coating 41 of the panel 4 is accommodated between glass folds 44 connected to each other by adhesive layers. As example, the longitudinal cylindrical part 40A of the rigid seat 40 comprises interconnected glass folds 44, preferably three folds 44, whereas the radially inwardly part of the acoustic panel 4 comprises interconnected glass folds 44, preferably five folds 44. The folds 44 are bent at their upstream ends so as to radially extend towards the outside to form the radial fastening flange 40B of the panel 4 comprising eight folds 44 as shown in FIG. 6. To obtain a fastening flange 40B with a wanted thickness, further glass folds can be inserted between the bent parts of the folds 44 coming from the longitudinal cylindrical part 40A and those coming from the radially inwardly part of the acoustic panel 4.

Similarly, the annular layer 31 of the air blower casing 3 comprises six glass folds 44 on its radially inwardly part.

The soundproofing panel 4 according to the invention is advantageously removable from the air blower casing 3 and the inlet duct 2 of the turbomachine 1, which facilitates the operations of replacement of the panel 4 during the maintenance of the turbomachine 1, a long immobilization of the turbomachine 1 being unnecessary. Besides, such a panel 4 is particularly advantageous for a turbomachine 1 comprising an air blower casing 3 consisting of composite material. Indeed, the binding between the panel 4 and the air blower casing 3 limits the number of fastening points which largely facilitates the design of an air blower casing 3 with composite material. Besides, the assembly mode of the soundproofing panel 4 is advantageous in that it allows the air blower casing 3 to freely deform during the operation of the turbomachine 1 without deforming the acoustic coating of the panel 4. Indeed, if the acoustic coating was directly stuck or screwed to the internal surface of the air blower casing 3, this last one would deform with the air blower casing 3. The presence of a rigid seat 40 allows advantageously to make the acoustic coating 41 independent of the air blower casing 3. Preferably, the rigid seat 40 consists of composite material so as to limit the surface area stresses between the rigid seat 40 and the air blower casing 3 while limiting the mass of the turbomachine 1.

Furthermore, the assembly of the one-piece insulation panel 4 is simple to implement since it is sufficient to mount it independently from the inlet duct 2 in the air blower casing 3. The inlet duct 2 is mounted according to the prior art to the air blower casing 3 which speeds up the assembly as well as the maintenance.

Support Means of the Downstream End of the Soundproofing Panel

According to a first embodiment of the insulation panel 4, in reference to FIG. 4, this last one does not comprise support means provided at its downstream end, the insulation panel 4 being only maintained upstream by the fastening flange 40B.

In the following embodiments represented from the FIG. 7A, the turbomachine comprises support means of the downstream end of the soundproofing panel 4 in the air blower casing 3 to improve the fastening and the assembly of the acoustic panel 4 in the turbomachine.

Such support means allow to distribute the fastening regions of the soundproofing panel between its upstream and downstream ends. Advantageously, it allows to decrease the axial thickness of the fastening flange 40B and so to decrease its mass. The support means of the turbomachine can be only formed on an element of the air blower casing or on an element of the air blower casing and the insulation panel. The element of air blower casing 3 has to be understood as a structural element as well as an element assembled to the air blower casing 3, for example, the downstream annular layer 31 attached to the internal cylindrical surface of the air blower casing 3 just in front of the blades of the air blower 8.

As exemplary support means formed only on an element of air blower casing, the support means can appear in the shape of a circumferential trough opened towards upstream to receive the downstream end of the rigid seat of the panel 4. Likewise, a plurality of fastening slugs, mounted to the circumference of the air blower casing 3 and longitudinally extending towards the downstream, so that these last ones penetrate into the radial thickness of the acoustic panel 4, can be provided, such fastening slugs being known by the patent application WO 2007/110491.

Figure 7A:
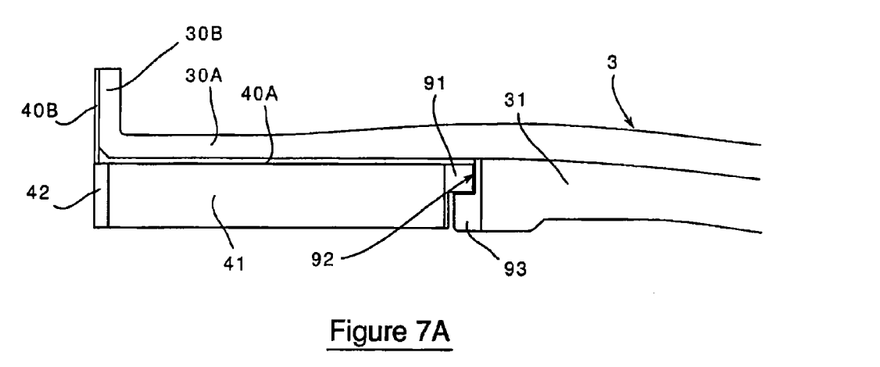
FIG. 7A is an axial sectional view of a second embodiment of an insulation panel according to the invention mounted to an air blower casing of a turbomachine.

Insulation panels 4 comprising support means formed on an element of the air blower casing and the insulation panel are represented from the FIG. 7A.

Figure 7B:
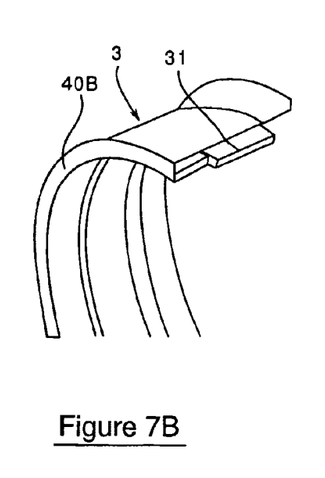
FIG. 7B is a partial perspective view of the insulation panel of FIG. 7A mounted to the air blower casing.
Figure 7C:
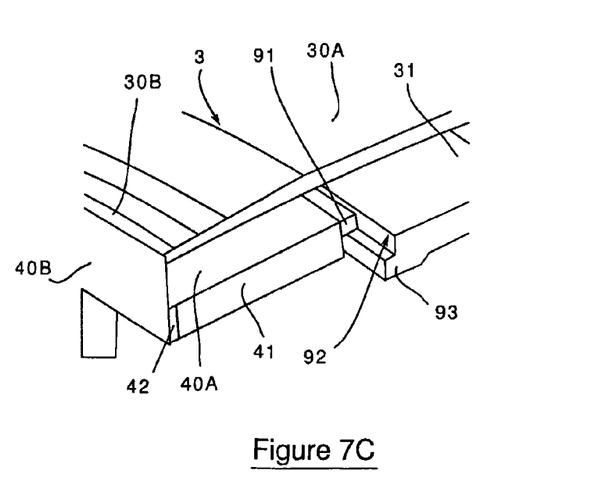
FIG. 7C is a closer partial perspective view of the insulation panel of FIG. 7B in the air blower casing.

A second embodiment of an insulation panel 4, represented in FIGS. 7A-7C, presents a downstream end on which is formed an annular tongue 91 intended to fit into an annular groove 92 formed in an element of the air blower casing 3.

Referring more particularly to FIG. 7A, the tongue 91 of the soundproofing panel 4 is formed in the acoustic coating 41 of the panel 4 by division of the downstream reinforcement region 42 of the acoustic coating 41, preferably, of its radially inwardly part as shown in FIG. 7A.

The groove 92 is formed between the internal surface of the air blower casing 3 and an annular tongue 93, formed in the downstream annular layer 31 of the air blower casing 3 by division of its upstream reinforcement region 42, preferably of its radially inwardly part as shown in FIG. 7A.

The assembly of the soundproofing panel 4 is realized by insertion of the panel 4 from upstream towards downstream so that the tongue 91 of the panel 4 is received in the groove 92 so that the panel 4 longitudinally extends inside the air blower casing 3. The downstream end of the panel 4 is then maintained at 360° in the groove 92 which ensures a total support. The support of the insulation panel 4 downstream allows advantageously to promote the fastening of its fastening flange 40B upstream. Tongues 91, 93 formed in reinforcement regions 42 were represented to allow a support limiting the wears during the assembly. It is obvious that the tongues 91, 93 could be formed in others regions of the acoustic coating 41 or of the downstream annular layer 31.

Referring to FIGS. 7A-7C, tongues 91 were represented the thickness radial of which is essentially equal, it is obvious that they could be different. Preferably, the internal surfaces of the acoustic coating 41 of the panel 4 and of the downstream annular layer 31 are essentially continuous to allow a homogeneous acoustic attenuation.

Figure 8A:
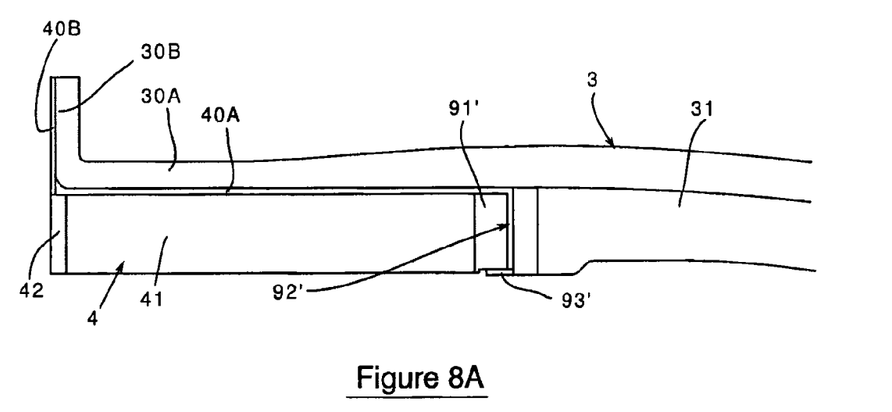
FIG. 8A is an axial sectional view of a third embodiment of an insulation panel according to the invention mounted to an air blower casing of a turbomachine.
Figure 8B:
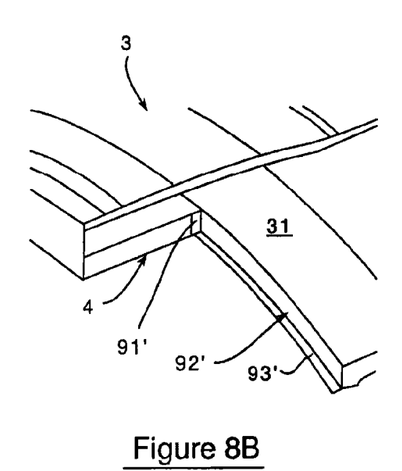
FIG. 8B is a closer partial perspective view of the insulation panel of FIG. 8A.

Referring to FIGS. 8A to 8B representing a third embodiment of an insulation panel 4 according to the invention, similarly to the previous embodiment, the downstream end of the soundproofing panel 4 comprises an annular tongue 91' mounted in an annular groove 92' formed between the internal surface of the air blower casing 3 and an annular tongue 93' formed in the downstream annular layer 31 of the air blower casing 3. In this example, the tongue 92' of the panel 4 has a radial thickness greater to that of the tongue 93' of the air blower casing 3 as shown in FIG. 8A. As example, the radial thickness of the tongue 93' of the downstream annular layer 31 of the air blower casing 3 is approximately 2 mm whereas the radial thickness of the tongue 91' of the panel 4 is approximately 30 mm. So, the radial thickness of the acoustic coating 41 of the panel 4 remains essentially constant along its length which improves the soundproofing of the turbomachine.

Advantageously, the annular tongue 93' of the downstream annular layer 31 of the air blower casing 3 is formed by glass folds 44 coming directly from the radially inwardly part of downstream annular layer 31 mounted to the air blower casing 3. So, the annular tongue 93' do not require important modifications of the annular layer 31, the annular tongue 93' presenting an important rigidity and being simple to manufacture.

Figure 8C:
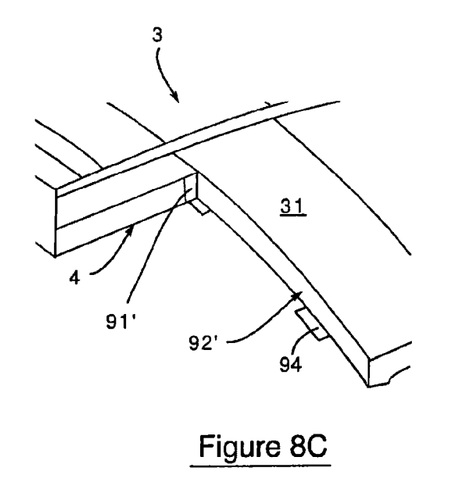
FIG. 8C is a closer partial perspective view of a variant of the insulation panel of FIG. 8B.

Alternately, the annular circumferential tongue of the downstream annular layer 31 can be machined so as to form hooks 94, angularly distributed on the circumference of the air blower casing 3 as shown in FIG. 8C. Such support hooks 94 allow to limit the mass of the turbomachine comparing to an annular tongue 93, 93'.

Figure 9A:
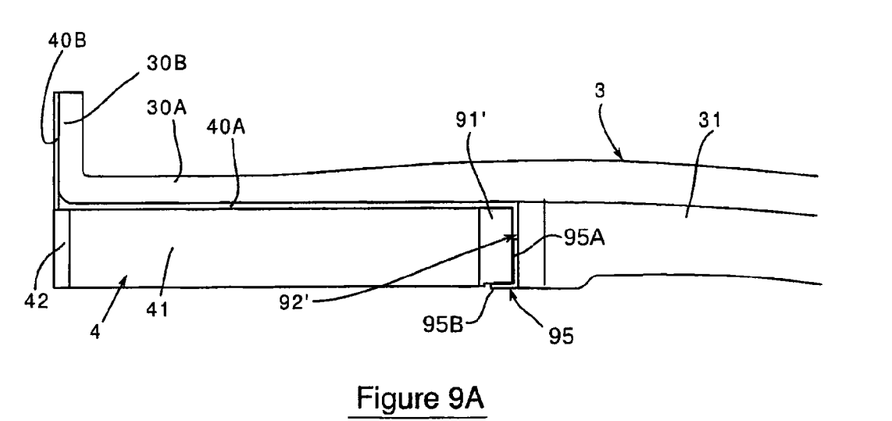
FIG. 9A is an axial sectional view of a fourth embodiment of an insulation panel according to the invention mounted to an air blower casing of a turbomachine.
Figure 9B:
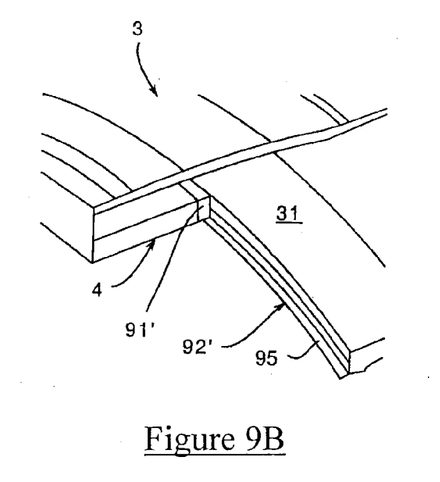
FIG. 9B is a closer partial perspective view of the insulation panel of FIG. 9A.
Figure 9C:
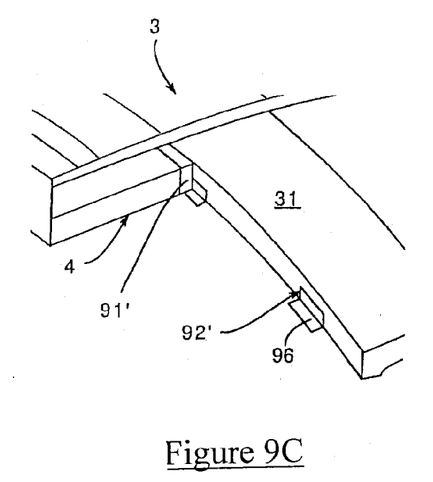
FIG. 9C is a closer partial perspective view of a variant of the insulation panel of FIG. 9B.

According to a fourth embodiment of an insulation panel 4 according to the invention, referring to FIGS. 9A-9B, an annular tongue 95 is assembled to the air blower casing 3 so as to form an annular groove 92' similar to the third embodiment. In this example, the annular tongue 95 is stuck on an upstream radial face of the downstream annular layer 31 of the air blower casing 3 as shown in FIG. 9A. The annular tongue 95 has in this example, a L-shaped section a radial part of which 95A is stuck to the downstream annular layer 31 of the air blower casing 3 whereas a longitudinal part 95B extends from the lower end of the radial part 95A towards upstream to form a support groove 92' with the internal surface of the air blower casing 3. Alternately, in reference to FIG. 9C, the annular circumferential tongue can be replaced by support hooks 96 angularly distributed on the circumference of the air blower casing 3. Similarly, each support hook 96 has a L-shaped section a radial part of which is stuck to the downstream annular layer 31 of the air blower casing 3 whereas a longitudinal part extends from the lower end of the radial part towards upstream to form a support groove 92' with the internal surface of the air blower casing 3. A support hook 96 can be rectilinear or curved.

Figure 10A:
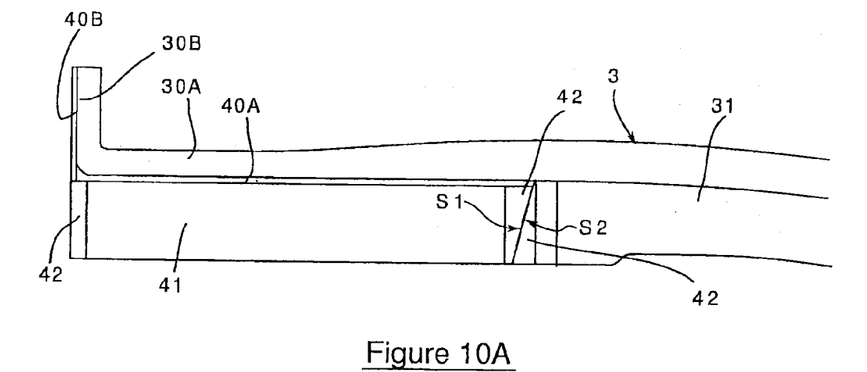
FIG. 10A is an axial sectional view of a fifth embodiment of an insulation panel according to the invention mounted to an air blower casing of a turbomachine.

According to a fifth embodiment of an insulation panel 4 according to the invention, the insulation panel 4 comprises at its downstream end support means arranged to cooperate by wedging effect with an element of air blower casing 3.

Figure 10B:
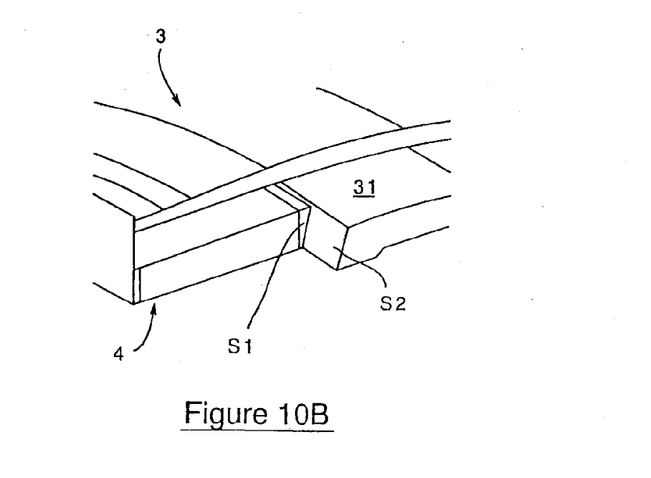
FIG. 10B is a closer partial perspective view of the insulation panel of FIG. 10A.

As example, in reference to FIGS. 10A-10B, the downstream end of the insulation panel 4 has a conical surface so as to form a first seating surface S1 flared from upstream towards downstream as shown in FIG. 10A. Otherwise, the section of the downstream end of the insulation panel 4 along an axial plan is a segment extending obliquely to the radial direction as shown in FIG. 10A. Preferably, the radially inwardly part of the downstream end of the insulation panel 4 comprises a chamfer, preferably, at its reinforcement region 42.

To allow a support by wedging effect, the downstream annular layer 31 of the air blower casing 3 comprises a conical surface so as to form a second seating surface S2 flared from downstream towards upstream to support the first seating surface S1 of the insulation panel 4. Preferably, the radially outwardly part of the upstream end of the downstream annular layer 31 comprises a chamfer, preferably, at its reinforcement region 42, to form the second seating surface S2.

During the assembly of the insulation panel 4, the first seating surface S1 of the panel 4 comes in contact with the second seating surface S2 of the air blower casing 3. When an operator axially translates the insulation panel 4 towards downstream, the outside surface of the insulation panel 4 is guided against the internal surface of the air blower casing 3 because of the skewing of the seating surfaces S1, S2. The effort of longitudinal translation towards upstream applied to the upstream end of the panel 4 is transformed into an effort of radial translation towards the outside at the downstream end of the panel 4 which guarantees an easy and accurate assembly.

Figure 11A:
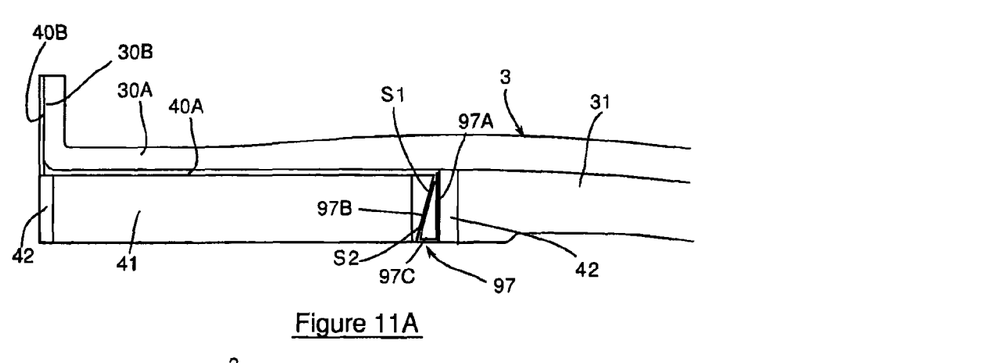
FIG. 11A is an axial sectional view of a sixth embodiment of an insulation panel according to the invention mounted to an air blower casing of a turbomachine.
Figure 11B:
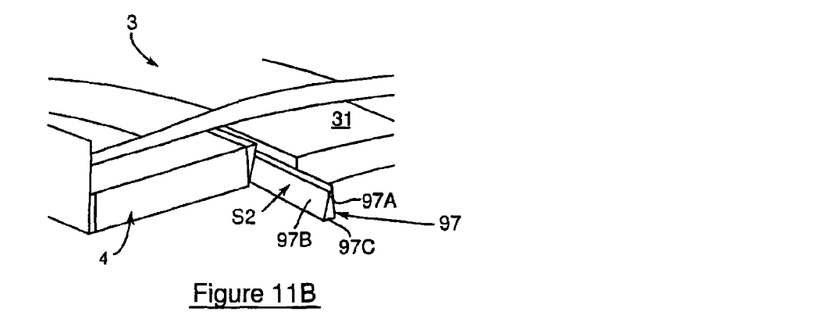
FIG. 11B is a closer partial perspective view of the insulation panel of FIG. 11A.

According to a sixth embodiment of an insulation panel 4 according to the invention, an interface element 97 is mounted to the upstream radial face of the downstream annular layer 31 of the air blower casing 3 to form the second seating surface S2 as shown in FIGS. 11A-11B. The interface element 97 comprises a downstream radial wall 97A stuck to the downstream annular layer 31 of the air blower casing 3 and a skew upstream wall 97B forming the second seating surface S2.

The skew length of the second seating surface S2 is preferably equal to that of the first seating surface S1 (FIG. 11B) but it is obvious that it could be shorter (FIG. 11A).

Preferably, the downstream radial wall 97A and the skew wall 97B are connected by a radially inwardly longitudinal wall 97C extending essentially in the continuation of the radially inwardly surface of the downstream annular layer 31 of the air blower casing 3 as shown in FIG. 11A. Preferably, the interface element 97 appears in the form of a silicone joint so as to limit the wears, which is, preferably, hollow to decrease its cost and its mass.

Here, the interface element 97 is annular and one-piece to limit the number of stages of assembly in the turbomachine. It is obvious that several interface elements could also be mounted to the circumference of the air blower casing 3.

Figure 11C:
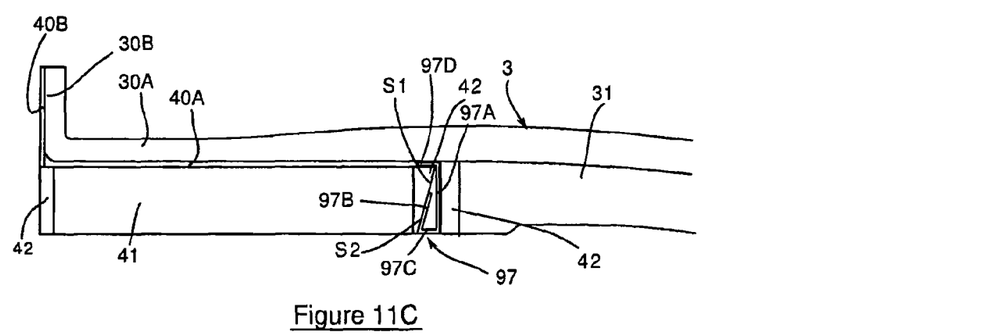
FIG. 11C is an axial sectional view of a variant of the sixth embodiment of an insulation panel according to the invention mounted to an air blower casing of a turbomachine.
Figure 11D:
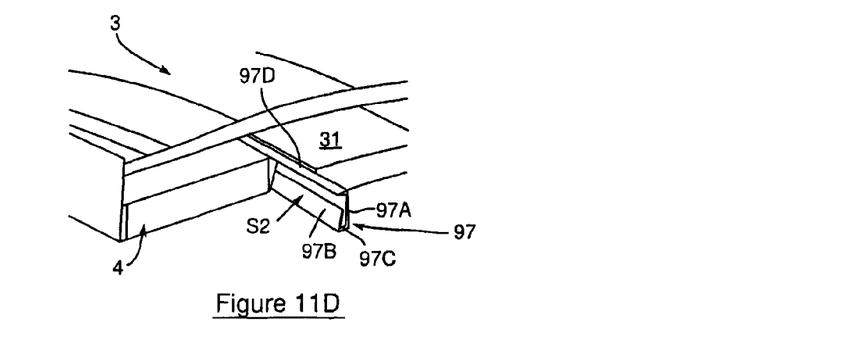
FIG. 11D is a closer partial perspective view of the insulation panel of FIG. 11C.

Alternately, in reference to FIGS. 11C and 11D, the interface element 97 can further comprises a radially outwardly longitudinal wall 97D extending essentially in the continuation of the radially outwardly surface of the downstream annular layer 31 of the air blower casing 3 from the top end of the radial wall 97A as shown in FIG. 11C. Preferably, the outside longitudinal wall 97D is essentially so long as the internal longitudinal wall 97C. The outside longitudinal wall 97D of the interface element 97 forms advantageously a longitudinal tongue allowing to avoid a friction of the downstream end of the insulation panel 4 against the internal surface of the air blower casing 3. Besides, the outside longitudinal wall 97D allows to hang on to the soundproofing panel 4 in case of break of the binding between the interface element 97 and the downstream annular layer 31 of the air blower casing 3. So, if the vibrations of the turbomachine lead to a shearing of the glue layer making the interface element 97 integral with the downstream annular layer 31, the outside longitudinal wall 97D allows to maintain the interface element 97 between the downstream annular layer 31 of the air blower casing 3 and the soundproofing panel 4. The outside longitudinal wall 97D so forms "anti-loss" means.

The invention claimed is:

1. A one-piece soundproofing panel attached within an circumferential air blower casing of a turbomachine, comprising an axis, in which circulates an airflow from upstream to downstream, the panel comprising:
    a circumferential rigid seat comprising:
        a longitudinal cylindrical part axially extending with respect to the axis of the turbomachine, the cylindrical part comprising an outside surface, which faces an internal surface of the air blower casing, and an internal surface to which a soundproofing coating is applied; and
        an annular fastening flange formed at an upstream end of the longitudinal cylindrical part and radially outwardly extending, the fastening flange being cooperating with a fastening flange of the air blower casing,
    wherein a length of the panel is provided such that the cylindrical part fills a longitudinal space between an upstream annular layer attached to an internal cylindrical surface of an inlet duct and a downstream annular layer attached to the internal surface of the air blower casing just in front of blades of an air blower, the downstream annular layer including an abradable material which comes into contact with the blades of the air blower, and
    wherein a radial thickness of an upstream end of the soundproofing coating is adapted so that internal surfaces of the upstream annular layer and of the soundproofing coating are continuous at a first interface therebetween, and a radial thickness of a downstream end of the soundproofing coating is adapted so that internal surfaces of the downstream annular layer and of the soundproofing coating are continuous at a second interface therebetween.

2. The panel according to claim 1, wherein a downstream end of the panel comprises a support device which maintains the outside surface of the panel near the internal surface of the air blower casing.

3. The panel according to claim 2, wherein the support device is formed in the soundproofing coating of the insulation panel.

4. The panel according to claim 1, wherein at least one of the upstream or downstream ends of the soundproofing coating includes a rigid reinforcement.

5. The panel according to claim 1, wherein the soundproofing coating includes a one-piece sandwich panel comprising at least a honeycomb layer covered with a perforated skin.

6. A turbomachine, intended for the propulsion of an aircraft, comprising a turbomachine axis in which circulates an airflow from upstream to downstream, the turbomachine comprising:
    a circumferential air blower casing;
    a circumferential inlet duct mounted upstream to the air blower casing; and
    a soundproofing panel according to claim 1,
    wherein the fastening flange of the soundproofing panel extends between the inlet duct and the air blower casing.

7. The turbomachine according to claim 6, wherein the air blower casing comprises an upstream fastening flange, the inlet duct comprises a downstream fastening flange, and the fastening flange of the panel extends between the fastening flanges of the inlet duct and the air blower casing.

8. The turbomachine according to claim 7, wherein the fastening flanges of the inlet duct, the air blower casing and the insulation panel are together made fastened together by a fastener longitudinally extending with respect to the axis of the turbomachine.

9. The turbomachine according to claim 6, wherein the turbomachine comprises a support device at a downstream end of the soundproofing panel in an element of the air blower casing.

10. A method for the assembly of a turbomachine according to claim 6, comprising:
    mounting the soundproofing panel to the air blower casing so that the outside surface of its rigid seat is facing with the internal surface of the air blower casing, the fastening flange of the soundproofing panel being in contact with a upstream fastening flange of the air blower casing;
    placing a downstream fastening flange of the inlet duct in contact with the fastening flange of the soundproofing panel; and
    fastening together the fastening flanges of the inlet duct, the soundproofing panel and the air blower casing.

11. The panel according to claim 2, wherein the downstream end of the panel includes an annular tongue which fits into an annular groove provided in an element of the air blower casing.

12. The panel according to claim 2, wherein the downstream end of the panel has a conical surface presenting a first seating surface which is flared from upstream towards downstream, and cooperating with a conical surface provided on the downstream annular layer of the air blower casing presenting a second seating surface which is flared from downstream towards upstream.

13. The turbomachine according to claim 9, wherein the downstream end of the panel includes an annular tongue which fits into an annular groove provided in the element of the air blower casing, the annular groove being formed between the internal surface of the air blower casing and an annular tongue formed in the downstream annular layer of the air blower casing.

14. The turbomachine according to claim 13, wherein a radially thickness of the tongue at the downstream end of the panel is substantially equal to a radial thickness of the tongue formed in the downstream annular layer.

15. The turbomachine according to claim 13, wherein a radially thickness of the tongue at the downstream end of the panel is greater than a radial thickness of the tongue formed in the downstream annular layer.

16. The turbomachine according to claim 9, wherein the downstream end of the panel has a conical surface presenting a first seating surface which is flared from upstream towards downstream.

17. The turbomachine according to claim 16, wherein the first seating surface cooperates with a conical surface provided on the downstream annular layer of the air blower casing presenting a second seating surface which is flared from downstream towards upstream.

18. The turbomachine according to claim 16, wherein the first seating surface cooperates with an interface element mounted to an upstream radial face of the downstream annular layer, the interface element including a downstream radial wall attached to the downstream annular layer and a skew upstream wall presenting a second seating surface.

\* \* \* \* \*